United States Patent

Kerr

[11] Patent Number: 5,997,119
[45] Date of Patent: Dec. 7, 1999

[54] MAGNETIC ARRANGEMENT FOR PRINTHEAD POSITIONING IN AN IMAGE PROCESSING APPARATUS

[75] Inventor: Roger S. Kerr, Brockport, N.Y.

[73] Assignee: Eastman Kodak Company, Rochester, N.Y.

[21] Appl. No.: 09/143,002

[22] Filed: Aug. 28, 1998

[51] Int. Cl.$^6$ .................................. F16C 19/06
[52] U.S. Cl. .................... 346/139 R; 346/139 D
[58] Field of Search .......... 346/139 R, 139 D; 347/224, 225, 223; 400/283, 323, 320

[56] References Cited

U.S. PATENT DOCUMENTS

| | | | |
|---|---|---|---|
| 3,934,950 | 1/1976 | Kuhlman | 310/90.5 |
| 4,043,612 | 8/1977 | Orcutt | 384/110 |
| 4,445,060 | 4/1984 | Ruhle et al. | 310/154 |
| 4,473,259 | 9/1984 | Goldowsky | 310/90.5 |
| 4,647,891 | 3/1987 | Hughes | 335/302 |
| 4,833,490 | 5/1989 | Zur | 346/139 R |
| 4,857,873 | 8/1989 | Gillings | 335/285 |
| 4,863,240 | 9/1989 | Nakajima et al. | 359/814 |
| 4,992,768 | 2/1991 | Mozis et al. | 335/306 |
| 5,017,819 | 5/1991 | Patt et al. | 310/90.5 |
| 5,038,063 | 8/1991 | Graber et al. | 310/115 |
| 5,148,066 | 9/1992 | Beale et al. | 310/17 |
| 5,213,251 | 5/1993 | Wolff | 228/199 |
| 5,268,708 | 12/1993 | Harshbarger et al. | 346/134 |
| 5,407,283 | 4/1995 | Ohtsuka et al. | 384/130 |
| 5,700,140 | 12/1997 | Gray et al. | 418/104 |
| 5,715,600 | 2/1998 | Marriott et al. | 29/898.07 |
| 5,729,066 | 3/1998 | Soong et al. | 310/90.5 |
| 5,829,889 | 11/1998 | Kerr et al. | 384/446 |

OTHER PUBLICATIONS

Lester R. Moskowitz, *Permanent Magnet Design and Application Handbook*; Robert E. Kriege Publishing Company, Malabar, Florida; pp. 81–84 and 177, 1986.

*Primary Examiner*—N. Le
*Assistant Examiner*—Lamson D. Nguyen
*Attorney, Agent, or Firm*—David A. Novais

[57] ABSTRACT

An image processing apparatus (10) for sheet thermal print media. The image processing apparatus (10) comprises a vacuum imaging drum (300) for holding thermal print media (32) and dye donor material (36) in registration on the vacuum imaging drum (300). A printhead (500) moves along a line parallel to a longitudinal axis of the vacuum imaging drum (300) as the vacuum imaging drum (300) rotates. The printhead (500) receives information signals and produces radiation which is directed to the dye donor material (36) which causes color to transfer from the dye donor material (36) to the thermal print media (32). The printhead (500) is mounted on a movable translation stage member (220) that moves in its travel path, guided along by translation bearing rods (206, 208) that are magnetically held to a frame (202) for straightening by holding magnets (528). To minimize the friction caused by magnetism used for straightening these bearing rods, the translation stage member (220) is provided with one or more magnets (524) that provide a repulsive force against holding magnets (528). As a further embodiment, the printhead (500) is magnetically held in place on the translation stage member by means of printhead holding magnets (144). To provide a bearing surface (having a low frictional coefficient) that allows movement of the printhead (500) for focus and angular adjustment, each printhead holding magnet (144) is provided with a bearing cap (146).

17 Claims, 6 Drawing Sheets

MAGNETIC ARRANGEMENT FOR PRINTHEAD POSITIONING IN AN IMAGE PROCESSING APPARATUS

CROSS REFERENCE TO RELATED APPLICATIONS

The present application is related to co-pending U.S. application Ser. No. 09/143,007 filed Aug. 28, 1998 by Roger S. Kerr, entitled METHOD AND APPARATUS TO PROVIDE A LOADING FORCE FOR PRINT-HEAD ADJUSTMENT USING MAGNETS.

FIELD OF THE INVENTION

The present invention relates to a subsystem of an image processing apparatus of the lathe bed scanning type having a printhead mounted on a translation stage; and more specifically to the use of magnets to provide proper positional relationships of the printhead with respect to an imaging drum.

BACKGROUND OF THE INVENTION

Pre-press color proofing is a procedure that is used by the printing industry for creating representative images of printed material, without the high cost and time that is required to actually produce printing plates and set up a high-speed, high-volume, printing press to produce a single example of an intended image. These intended images may require several corrections and may need to be reproduced several times to satisfy the requirements of customers, resulting in a large loss of profits. By utilizing pre-press color proofing time and money can be saved.

One such commercially available image processing apparatus, which is depicted in commonly assigned U.S. Pat. No. 5,268,708 is an image processing apparatus having half-tone color proofing capabilities. This image processing apparatus is arranged to form an intended image on a sheet of thermal print media by transferring dye from a sheet of dye donor material to the thermal print media by applying a sufficient amount of thermal energy to the dye donor material to form an intended image. This image processing apparatus is comprised generally of a material supply assembly or carousel, lathe bed scanning subsystem (which includes a lathe bed scanning frame, a translation drive, a translation stage member, a printhead, and a vacuum imaging drum), and thermal print media and dye donor material exit transports.

The operation of the above image processing apparatus comprises metering a length of the thermal print media (in roll form) from the material assembly or carousel. The thermal print media is then measured and cut into sheet form of the required length, transported to the vacuum imaging drum, registered, wrapped around and secured onto the vacuum imaging drum. Next a length of dye donor material (in roll form) is also metered out of the material supply assembly or carousel, then measured and cut into sheet form of the required length. It is then transported to and wrapped around the vacuum imaging drum, such that it is superposed in the desired registration with respect to the thermal print media (which has already been secured to the vacuum imaging drum).

After the dye donor material is secured to the periphery of the vacuum imaging drum, the scanning subsystem or write engine provides the scanning function. This is accomplished by retaining the thermal print media and the dye donor material on the spinning vacuum imaging drum while it is rotated past the printhead that will expose the thermal print media. The translation drive then traverses the printhead and translation stage member axially along the vacuum imaging drum, in coordinated motion with the rotating vacuum imaging drum. These movements combine to produce the intended image on the thermal print media.

After the intended image has been written on the thermal print media, the dye donor material is then removed from the vacuum imaging drum. This is done without disturbing the thermal print media that is beneath it. The dye donor material is then transported out of the image processing apparatus by the dye donor material exit transport. Additional dye donor materials are sequentially superposed with the thermal print media on the vacuum imaging drum, then imaged onto the thermal print media as previously mentioned, until the intended image is completed. The completed image on the thermal print media is then unloaded from the vacuum imaging drum and transported to an external holding tray on the image processing apparatus by the receiver sheet material exit transport.

The material supply assembly comprises a carousel assembly mounted for rotation about its horizontal axis on bearings at the upper ends of vertical supports. The carousel comprises a vertical circular plate having in this case six (but not limited to six) material support spindles. These support spindles are arranged to carry one roll of thermal print media, and four rolls of dye donor material to provide the four primary colors used in the writing process to form the intended image, and one roll as a spare or for a specialty color dye donor material (if so desired). Each spindle has a feeder assembly to withdraw the thermal print media or dye donor material from the spindles to be cut into a sheet form. The carousel is rotated about its axis into the desired position, so that the thermal print media or dye donor material (in roll form) can be withdrawn, measured, and cut into sheet form of the required length, and then transported to the vacuum imaging drum.

The scanning subsystem or write engine of the lathe bed scanning type comprises a mechanism that provides the mechanical actuators, for the vacuum imaging drum positioning and motion control to facilitate placement, loading onto, and removal of the thermal print media and the dye donor material from the vacuum imaging drum. The scanning subsystem or write engine provides the scanning function by retaining the thermal print media and dye donor material on the rotating vacuum imaging drum, which generates a once per revolution timing signal to the data path electronics as a clock signal; while the translation drive traverses the translation stage member and printhead axially along the vacuum imaging drum in a coordinated motion with the vacuum imaging drum rotating past the printhead. This is done with positional accuracy maintained, to allow precise control of the placement of each pixel, in order to produce the intended image on the thermal print media.

The lathe bed scanning frame provides the structure to support the vacuum imaging drum and its rotational drive. The translation drive with a translation stage member and printhead are supported by two translation bearing rods that are substantially straight along their longitudinal axis and are positioned parallel to the vacuum imaging drum and lead screw. Consequently, they are parallel to each other therein forming a plane, along with the vacuum imaging drum and lead screw. The translation bearing rods are, in turn, supported by outside walls of the lathe bed scanning frame of the lathe bed scanning subsystem or write engine. The translation bearing rods are positioned and aligned therebetween, for permitting low friction movement of the translation stage member and the translation drive. The translation bearing rods are sufficiently rigid for this application, so as not to sag or distort between the mounting points at their ends. They are arranged to be as exactly parallel as is possible with the axis of the vacuum imaging drum. The front translation bearing rod is arranged to locate the axis of the printhead precisely on the axis of the vacuum imaging drum with the axis of the printhead located perpendicular, vertical, and horizontal to the axis of the vacuum imaging drum. The translation stage member front bearing is arranged to form an inverted "V" and provides only that constraint to the translation stage member. The translation stage member with the printhead mounted on the translation stage member, is held in place by only its own weight. The rear translation bearing rod locates the translation stage member with respect to rotation of the translation stage member about the axis of the front translation bearing rod. This is done so as to provide no over constraint of the translation stage member which might cause it to bind, chatter, or otherwise impart undesirable vibration or jitters to the translation drive or printhead during the writing process causing unacceptable artifacts in the intended image. This is accomplished by the rear bearing which engages the rear translation bearing rod only on a diametrically opposite side of the translation bearing rod on a line perpendicular to a line connecting the centerlines of the front and rear translation bearing rods.

The translation drive is for permitting relative movement of the printhead by synchronizing the motion of the printhead and stage assembly such that the required movement is made smoothly and evenly throughout each rotation of the drum. A clock signal generated by a drum encoder provides the necessary reference signal accurately indicating the position of the drum. This coordinated motion results in the printhead tracing out a helical pattern around the periphery of the drum. The above mentioned motion is accomplished by means of a DC servo motor and encoder which rotates a lead screw that is typically, aligned parallel with the axis of the vacuum imaging drum. The printhead is placed on the translation stage member in a "V" shaped groove, which is formed in the translation stage member, which is in precise positional relationship to the bearings for the front translation stage member supported by the front and rear translation bearing rods. The translation bearing rods are positioned parallel to the vacuum imaging drum, so that it automatically adopts the preferred orientation with respect to the surface of the vacuum imaging drum.

The printhead is selectively locatable with respect to the translation stage member, thus it is positioned with respect to the vacuum imaging drum surface. The distance between the printhead and the vacuum imaging drum surface is adjustable for focus. Extension springs provide the load against the adjustment screws for this focus adjustment. The angle of the printhead is also adjustable by rotating the cylindrical lens body. Here also, extension springs provide the load against the adjustment screw.

The translation stage member and printhead are attached to a rotatable lead screw (having a threaded shaft) by a drive nut and coupling. The coupling is arranged to accommodate misalignment of the drive nut and lead screw so that only rotational forces and forces parallel to the lead screw are imparted to the translation stage member by the lead screw and drive nut. The lead screw rests between two sides of the lathe bed scanning frame of the lathe bed scanning subsystem or write engine, where it is supported by deep groove radial bearings. At the drive end the lead screw continues through the deep groove radial bearing, through a pair of spring retainers, that are separated and loaded by a compression spring to provide axial loading, and to a DC servo drive motor and encoder. The DC servo drive motor induces rotation to the lead screw moving the translation stage member and printhead along the threaded shaft as the lead screw is rotated. The lateral directional movement of the printhead is controlled by switching the direction of rotation of the DC servo drive motor and thus the lead screw.

The printhead includes a plurality of laser diodes which are coupled to the printhead by fiber optic cables which can be individually modulated to supply energy to selected areas of the thermal print media in accordance with an information signal. The printhead of the image processing apparatus includes a plurality of optical fibers coupled to the laser diodes at one end and the other end to a fiber optic array within the printhead. The printhead is movable relative to the longitudinal axis of the vacuum imaging drum. The dye is transferred to the thermal print media as the radiation, transferred from the laser diodes by the optical fibers to the printhead and thus to the dye donor material is converted to thermal energy in the dye donor material.

The vacuum imaging drum is cylindrical in shape and includes a hollowed-out interior portion. The vacuum imaging drum further includes a plurality of holes extending through its housing for permitting a vacuum to be applied from the interior of the vacuum imaging drum for supporting and maintaining the position of the thermal print media and dye donor material as the vacuum imaging drum rotates. The ends of the vacuum imaging drum are enclosed by cylindrical end plates. The cylindrical end plates are each provided with a centrally disposed spindle which extends outwardly through support bearings and are supported by the lathe bed scanning frame. One of the spindles is a drive end spindle that extends through the support bearing and is stepped down to receive a DC drive motor rotor which is held on by means of a nut. A DC motor stator is stationarily held by the lathe bed scanning frame member, encircling the armature to form a reversible, variable speed DC drive motor for the vacuum imaging drum. At the end of the spindle an encoder is mounted to provide the timing signals to the image processing apparatus. The opposite spindle is a vacuum spindle and is provided with a central vacuum opening, which is in alignment with a vacuum fitting with an external flange that is rigidly mounted to the lathe bed scanning frame. The vacuum fitting has an extension which extends within but is closely spaced from the vacuum spindle, thus forming a small clearance. With this configuration, a slight vacuum leak is provided between the outer diameter of the vacuum fitting and the inner diameter of the opening of the vacuum spindle. This assures that no contact exists between the vacuum fitting and the vacuum imaging drum which might impart uneven movement or jitters to the vacuum imaging drum during its rotation.

The opposite end of the vacuum fitting is connected to a high-volume vacuum blower which is capable of producing 50–60 inches of water (93.5–112.2 mm of mercury) at an air flow volume of 60–70 cfm (28.368–33.096 liters per second). This provides the vacuum to the vacuum imaging drum to support the various internal vacuum levels of the vacuum imaging drum required during the loading, scanning and unloading of the thermal print media and the dye donor materials to create the intended image. With no media loaded on the vacuum imaging drum the internal vacuum level of the vacuum imaging drum is approximately 10–15 inches of water (18.7–28.05 mm of mercury). With just the thermal print media loaded on the vacuum imaging drum the internal vacuum level of the vacuum imaging drum is approximately 20–25 inches of water (37.4–46.75 mm of mercury); this is the level required when a dye donor material is removed so that thermal print media does not move, otherwise color to color registration will not be maintained. With both the thermal print media and dye donor material completely loaded on the vacuum imaging drum the internal vacuum level of the vacuum imaging drum is approximately 50–60 inches of water (93.5–112.2 mm of mercury) in this configuration.

The outer surface of the vacuum imaging drum is provided with an axially extending flat, which extends approximately 8 degrees of the vacuum imaging drum circumference. The vacuum imaging drum is also provided with a circumferential recess which extends circumferentially from one side of the axially extending flat, circumferentially around the vacuum imaging drum to the other side of the axially extending flat, and from approximately one inch (25.4 mm) from one end to approximately one inch (25.4 mm) from the other end of the vacuum imaging drum. The thermal print media when mounted on the vacuum imaging drum is seated in the circumferential recess and therefor the circumferential recess has a depth substantially equal to the thermal print media thickness seated therewithin, which is approximately 0.004 inches (0.102 mm) in thickness.

The purpose of the circumferential recess on the vacuum imaging drum surface is to eliminate any creases in the dye donor materials, as they are drawn down over the thermal print media during the loading of the dye donor materials. This assures that no folds or creases will be generated in the dye donor materials which could extend into the image area and seriously adversely affect the intended image. The circumferential recess also substantially eliminates the entrapment of air along the edge of the thermal print media, where it is difficult for the vacuum holes in the vacuum imaging drum surface to assure the removal of the entrapped air. Any residual air between the thermal print media and the dye donor material, can also adversely affect the intended image.

The purpose of the vacuum imaging drum axially extending flat is two-fold. First, it assures that the leading and trailing ends of the dye donor material are somewhat protected from the effect of air turbulence during the relatively high speed rotation that the vacuum imaging drum undergoes during the imaging process. Thus the air turbulence would have less tendency to lift the leading or trailing edges of the dye donor material. Second, the vacuum imaging drum axially extending flat also ensures that the leading and trailing ends of the dye donor material are recessed from the vacuum imaging drum periphery. This reduces the chance that the dye donor material can come in contact with other parts of the image processing apparatus, such as the printhead, causing a jam and possible loss of the intended image or worse, catastrophic damage to the image processing apparatus.

Further, the vacuum imaging drum axially extending flat acts to impart a bending force to the ends of the dye donor materials when they are held onto the vacuum imaging drum surface by vacuum from within the interior of the vacuum imaging drum. Consequently when the vacuum is turned off to that portion of the vacuum imaging drum, the end of the dye donor material will tend to lift from the surface of the vacuum imaging drum. Thus turning off of the vacuum eliminates the bending force on the dye donor material, and is used as an advantage in the removal of the dye donor material from the vacuum imaging drum.

The task of loading and unloading the dye donor materials onto and off from the vacuum imaging drum, requires precise positioning of thermal print media and the dye donor materials. The lead edge positioning of dye donor material must be accurately controlled during this process. Existing image processing apparatus designs, such as that disclosed in the above commonly assigned U.S. patent, employs a multi-chambered vacuum imaging drum for such lead-edge control. One appropriately controlled chamber applies vacuum that holds the lead edge of the dye donor material. Another chamber, separately valved, controls vacuum that holds the trail edge of the thermal print media, to the vacuum imaging drum. With this arrangement, loading a sheet of thermal print media and dye donor material requires that the image processing apparatus feed the lead edge of the thermal print media and dye donor material into position just past the vacuum ports controlled by the respective valved chamber. Then vacuum is applied, gripping the lead edge of the dye donor material against the vacuum imaging drum surface.

Unloading the dye donor material or the thermal print media (to discard the used dye donor material or to deliver the finished thermal print media to an output tray) requires the removal of vacuum from these same chambers so that an edge of the thermal print media or the dye donor material are freed and project out from the surface of the vacuum imaging drum. The image processing apparatus then positions an articulating skive into the path of the free edge to lift the edge further and to feed the dye donor material, to a waste bin or an output tray.

The sheet material exit transports include a dye donor material waste exit and the imaged thermal print media sheet material exit. The dye donor material exit transport comprises a waste dye donor material stripper blade disposed adjacent the upper surface of the vacuum imaging drum. In an unload position, the stripper blade is in contact with the waste dye donor material on the vacuum imaging drum surface. When not in operation, the stripper blade is moved up and away from the surface of the vacuum imaging drum. A driven waste dye donor material transport belt is arranged horizontally to carry the waste dye donor material, which is removed by the stripper blade from the surface of the vacuum imaging drum to an exit formed in the exterior of the image processing apparatus. A waste bin for the waste dye donor material is separate from the image processing apparatus. The imaged thermal print media sheet material exit transport comprises a movable thermal print media sheet material stripper blade that is disposed adjacent to the upper surface of the vacuum imaging drum. In the unload position, the stripper blade is in contact with the imaged thermal print media on the vacuum imaging drum surface. In the inoperative position, it is moved up and away from the surface of the vacuum imaging drum. A driven thermal print media sheet material transport belt is arranged horizontally to carry the imaged thermal print media removed by the stripper blade from the surface of the vacuum imaging drum. It then delivers the imaged thermal print media with the intended image formed thereon to an exit tray in the exterior of the image processing apparatus.

Although the presently known and utilized image processing apparatus is satisfactory, it is not without drawbacks. The front and rear bearing translation rods must be substantially straight to provide a structure that allows the desired degree of accuracy. Among the various methods used to straighten these rods are magnets that are mounted on the image processing apparatus, as disclosed in copending patent application U.S. Ser. No. 08/667,775 filed Jun. 21, 1996; entitled: AN APPARATUS FOR MAINTAINING THE POSITIONAL RELATIONSHIP OF A PRINT HEAD. However, using magnetic means to straighten these bearing rods in place can also affect printhead travel, introducing undesirable changes in friction as the printhead translation assembly passes over magnet positions. While the printhead translation assembly is maintained in position against the bearing rods substantially by its own weight, the addition of magnetic attraction toward the underlying bearing rod increases the torque required to move the printhead along its path of travel.

Conventional solutions for holding the printhead translation assembly against the front and rear bearing rods have unwanted side effects. For example, wheels or leaf spring arrangements require the addition of complex mechanical parts. Linear bearings (such as a ball slide bearing) would be prohibitively expensive, considering the length of the printhead travel path (typically more than 12 inches in imaging devices).

While normally the attractive force of permanent magnets is utilized, magnets have also been used in different types of devices to take advantage of repulsive force. Some typical uses include the following:

U.S. Pat. No. 5,017,819 to Patt, et al. which discloses the use of the linear spring force characteristics of magnets in any direction relative to an orthogonal coordinate system, with primary application to motor use. This patent concerns itself with methods for achieving a linear force constant for a long movement of the magnetic spring and for controlled oscillation (such as is needed with Stirling refrigeration motors).

U.S. Pat. No. 5,148,066 to Beale, et al. which discloses the use of magnetic springs for applying centering bias on a piston in a linear generator or motor.

U.S. Pat. No. 5,038,063 to Graber, et al. which discloses the use of a permanent magnet in combination with an electromagnet to form a magnetic spring; and U.S. Pat. No. 4,863,240 to Nakajima, et al. which discloses a design of a magnetic spring to constrain an objective lens in a neutral position.

While these patents and other known applications show the use of electromagnetic devices and permanent magnets to provide repulsive force, none of the patents cited above discloses or suggests positioning magnets so as to take advantage of magnetic repulsion to minimize friction for a table moving linearly along a support structure.

Therefore, the need exists for a simple method for maintaining the printhead translation assembly in position throughout its travel path, while, at the same time, minimizing the added friction caused by magnets used to straighten the translation bearing rods that form the support structure.

A further drawback of conventional arrangements is that a complex combination of support components is required to hold the printhead so that it is perfectly aligned orthogonally with respect to the vacuum imaging drum surface; and so that the printhead has the correct focus, which is determined by its distance from the drum surface (held constant throughout the printhead's travel path across the vacuum imaging drum). Also, the printhead must be adjusted for the proper rotational angle about its focus axis and must be held in position so as to maintain this angle throughout its travel path across the vacuum imaging drum. (This angle provides the intended swath width).

The focus and rotational angle must be initially adjusted in manufacture and may need to be adjusted once the equipment is installed and periodically during its lifetime. As described, the above-mentioned printhead translation stage uses spring-loaded mechanisms to achieve and maintain these critical adjustments. The existing system requires that a number of precision components be assembled on the translation stage, which adds considerable expense and complexity to the translation stage and makes the job of printhead adjustment or replacement an expensive, time-consuming operation.

To meet the requirements for adjustability and for maintaining these critical adjustments throughout its travel, the present invention further uses magnets to hold the printhead on the translation stage subassembly. This solution eliminates parts and cost, while meeting the requirements stated above.

Magnets however, can exhibit relatively poor bearing characteristics. As is well known in the art, the magnet surface using known magnetic materials is not designed to withstand frictional forces. This presents a problem with the use of magnets for this application. The magnets must be selected to have sufficient holding power to hold the printhead securely. But, at the same time, the magnets used to hold the printhead securely in place must also allow periodic adjustment. This requires that the magnet surface allow movement of the printhead against it, during adjustment, while withstanding any damage from frictional forces. Known approaches for protecting the magnet surface against sliding damage as documented by Lester R. Moskowitz, *Permanent Magnet Design and Application Handbook*, Robert E. Krieger Publishing Company, 1976 (page 81ff.), are concerned with increasing, rather than decreasing the frictional characteristics of the magnet surface.

Magnets may be selected from different types; for the preferred embodiment of this invention, coated magnets have been chosen. Coating of magnets is widely used to provide a surface that resists oxidation or corrosion in numerous applications, including use with dental appliances and veterinary instruments (where the magnetic material must be protected from corrosion, such as is disclosed in U.S. Pat. No. 4,857,873 where a dental device must be protected from saliva). But such coatings bonded to the magnet are optimized to prevent oxidation and corrosion and not to provide a bearing surface capable of withstanding sliding forces across its surface during adjustment, without damage.

Caps for magnets are used in various applications where the magnet must be protected, such as is disclosed for fabricating a sensor component in U.S. Pat. No. 5,213,251, in which a cap is applied to a magnetized piece, then the assembled unit is case-hardened for wear-resistance. This patent discloses protection of the magnet from mechanical wear, but not due to sliding forces.

It is important to note that the magnets used to hold the printhead in this application are fabricated and mounted with precision tolerance so that they align the printhead so that its focal axis is normal to the cylindrical surface of the vacuum imaging drum. Softer magnets, if selected for this application, could become worn as these magnets are subjected to wear. This could alter the precision alignment that these magnets are designed to provide.

Magnets are widely used in the art for their holding properties in various precision applications. However, the specific problem outlined above has not been addressed, since the existing applications have not applied magnets for holding other components where periodic adjustment requires that the magnet present an effective, durable bearing surface, having a low coefficient of friction that allows controlled incremental movement for precise adjustment.

SUMMARY OF THE INVENTION

The present invention is directed to overcoming the drawbacks described above.

According to one aspect of the present invention, the invention resides in an apparatus for maintaining the positional relationship of a printhead in a lathe bed scanner, where the printhead is mounted on a translation assembly and this translation assembly itself employs translation bearing rods that are straightened in place by means of magnetic attraction to a chassis or frame.

An object of the present invention is to minimize the frictional effects on the translation assembly due the magnetic attraction that holds the translation bearing rods.

An advantage of the present invention is that it provides a cost-effective method for design of the translation assembly that minimizes the number of parts needed to hold this assembly in correct position throughout its travel path.

The present invention also provides for one or more magnets mounted on the translation assembly with such polarity that these magnets provide a slight repulsive force against the attraction of the magnets, on the underlying frame, that hold the translation bearing rods. In so doing, this invention minimizes possible added friction due to magnetic attraction and maintains the correct translation assembly position throughout the travel path.

It is a further object of the present invention to add a cap to each magnet that is used to position and hold the printhead in place, where this cap presents a durable bearing surface that can withstand damage from frictional forces caused when the printhead is adjusted for focus and for rotational angle.

It is an advantage of the present invention that it allows the magnet to hold the printhead securely, while at the same time it allows rotation of the printhead body about its central axis and allows printhead focus adjustment in a direction parallel to the printhead's central axis.

In a further advantage of the present invention a bearing surface is provided against the printhead so that the focus and rotational adjustments can be repeated as many times as necessary without causing undue stress on the magnetic surface and without altering the printhead alignment provided by the combined magnet and cap structure.

In a further advantage of the present invention the printhead can be easily removed and repositioned (or replaced) without causing damage to the retaining magnets mounted in the translation assembly.

In a further advantage of the present invention, selection of holding magnets can be made based on optimal holding-power characteristics (typically expressed in terms of magnetic energy product, $BH_{max}$), without concern for magnet surface characteristics since the magnet surface is to be protected by means of a bearing cap.

In a further advantage of the present invention the translation stage subassembly that supports the printhead can have a minimal number of components for holding the printhead in position, thereby lowering assembly complexity and cost.

Therefore, according to a further aspect of the present invention, the invention resides in an imaging processing apparatus for receiving thermal print media and dye donor materials for processing an intended image onto the thermal print media. The image processing apparatus uses a printhead that is mounted on a translation subsystem where the printhead must be held at a precise focal distance from the vacuum imaging drum surface and where this printhead must be held at a precise rotational angle relative to the central axis of the cylindrical printhead body to maintain its swath width through the travel path. This invention provides bearing caps that protect the magnet surface from frictional forces that result when adjusting the printhead for focus or for swath width (rotational angle). These bearing caps allow the magnets to hold the printhead securely in place while at the same time allowing periodic adjustment for focus or rotational head angle, without causing damage to the magnet surface or the surface coating.

The present invention relates to an imaging apparatus for writing images to thermal print media which comprises an imaging drum for holding a receiver that accepts an image; a printhead having at least one light source, with the printhead being movable relative to the imaging drum along a travel path; at least one translation rod that guides the printhead along the travel path, with the at least one translation rod being magnetically held against a frame of the image processing apparatus by at least one first magnet provided on the frame; and a movable translation stage member on which the printhead is mounted. At least one second magnet is provided on the movable translation stage member so as to create a repulsive force against a magnetic force of the at least one first magnet.

The present invention further relates to an imaging apparatus which comprises a translation stage member adapted to hold a printhead thereon, with the translation stage member being movable along a travel path; at least one translation rod which guides the translation stage member along the travel path; a first magnetic member associated with a frame of the imaging apparatus, with the first magnetic member creating a magnetic force that holds the at least one translation rod against the frame; and a second magnetic member associated with the translation stage member and positioned so as to create a repulsive force against the magnetic force of the first magnetic member when the second magnetic member opposes the first magnetic member.

The present invention further relates to a method of movably supporting a printhead of an imaging apparatus which comprises the steps of: mounting a printhead on a translation stage member, with the translation stage member having a first magnet positioned thereon; holding a translation rod against a frame of the imaging apparatus by a magnetic force of at least one second magnet positioned on the frame, with the translation rod guiding the translation stage member; and mounting the translation stage member on the translation rod so that the first magnet creates a repulsive force against the magnetic force of the at least one second magnet when the first magnet opposes the at least one second magnet.

The present invention further relates to an image processing apparatus for writing images to a thermal print media which comprises a printhead having a plurality of light sources; a vacuum imaging drum; and a translation stage member that holds the printhead in position relative to the imaging drum.

The translation stage member comprises at least one mounting block that provides a holder for the printhead, and at least one magnet positioned on the at least one mounting block. The at least one magnet is positioned at an angle for holding the printhead so that the printhead is aligned in position relative to the imaging drum.

The present invention further relates to a method of movably supporting a printhead of an imaging apparatus which comprises the steps of: providing at least one mounting block on a translation stage member of an imaging apparatus; providing first and second magnetic members on the at least one mounting block; and providing a printhead on the at least one mounting block such that the first and second magnetic members support the printhead and permit linear and rotational movement of the printhead.

Although not described in detail, it would be obvious to someone skilled in the art that this invention could be used in other applications where a translation assembly moves along a travel path supported by translation bearing rods which are themselves held magnetically to an equipment frame. The present invention could also be used in other applications that use magnets to maintain a writing head (including a writing head using lasers, inkjet, or other marking technology), or other precision mechanisms or instruments in precise position, where occasional adjustment can cause frictional forces that might damage the surface of a magnet that is not protected by such means.

DETAILED DESCRIPTION OF THE INVENTION

Figure 1:
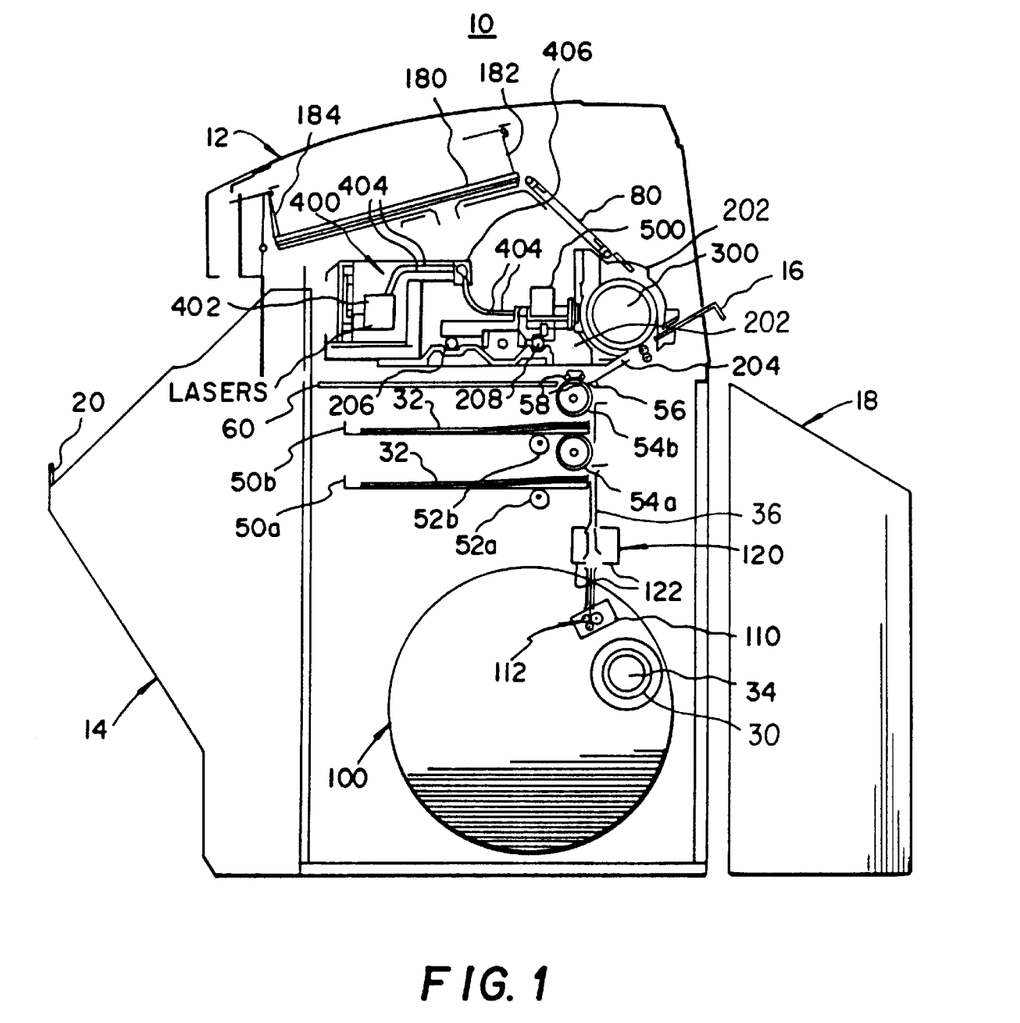
FIG. 1 is a side view in vertical cross section of an image processing apparatus of the present invention.

Referring now to the drawings, wherein like reference numerals designate identical or corresponding parts throughout the several views, FIG. 1 illustrates an image processing apparatus 10 according to the present invention. Image processing apparatus 10 includes an image processor housing 12 which provides a protective cover. A movable, hinged image processor door 14 is attached to a front portion of image processor housing 12 permitting access to two sheet material trays, a lower sheet material tray 50a and an upper sheet material tray 50b, that are positioned in an interior portion of image processor housing 12 for supporting thermal print media 32, thereon. Only one of sheet material trays 50a, 50b will dispense thermal print media 32 out of its sheet material tray to create an intended image thereon; the alternate sheet material tray 50a, 50b either holds an alternative type of thermal print media 32 or functions as a back up sheet material tray. In this regard, lower sheet material tray 50a includes a lower media lift cam 52a for lifting lower sheet material tray 50a and ultimately thermal print media 32, upwardly toward a rotatable, lower media roller 54a and toward a second rotatable, upper media roller 54b which, when both are rotated, permits thermal print media 32 in lower sheet material tray 50a to be pulled upwardly towards a movable media guide 56. Upper sheet material tray 50b includes an upper media lift cam 52b for lifting upper sheet material tray 50b and ultimately thermal print media 32 in upper sheet material tray 50b towards the upper media roller 54b which directs it towards movable media guide 56.

Movable media guide 56 directs thermal print media 32 under a pair of media guide rollers 58 which engages thermal print media 32 for assisting upper media roller 54b in directing it onto a media staging tray 60. Media guide 56 is attached and hinged to a lathe bed scanning frame 202 (FIG. 2) at one end, and is uninhibited at its other end for permitting multiple positioning of media guide 56. Media guide 56 then rotates its uninhibited end downwardly, as illustrated in the position shown in FIG. 1, and the direction of rotation of upper media roller 54b is reversed for moving thermal print media 32 resting on media staging tray 60 under the pair of media guide rollers 58, upwardly through an entrance passageway 204 and around a rotatable vacuum imaging drum 300.

A roll 30 of dye donor roll material 34 is connected to a media carousel 100 in a lower portion of image processor housing 12. Four rolls 30 of material 34 are used, but only one is shown for clarity. Each roll 30 includes a dye donor roll material 34 of a different color, typically black, yellow, magenta and cyan. These dye donor roll materials 34 are ultimately cut into dye donor sheet materials 36 and passed to the vacuum imaging drum 300 for forming the medium from which dyes imbedded therein are passed to thermal print media 32 resting thereon, which process is described in detail herein below. In this regard, a media drive mechanism 110 is attached to each roll 30 of dye donor roll material 34, and includes three media drive rollers 112 through which dye donor roll material 34 of interest is metered upwardly into a media knife assembly 120. After dye donor roll material 34 reaches a predetermined position, media drive rollers 112 cease driving dye donor roll material 34 and two media knife blades 122 positioned at a bottom portion of media knife assembly 120 cut dye donor roll material 34 into dye donor sheet materials 36. Lower media roller 54a and upper media roller 54b along with media guide 56 then pass dye donor sheet material 36 onto media staging tray 60 and ultimately to vacuum imaging drum 300 and in registration with thermal print media 32 using the same process as described above for passing thermal print media 32 onto vacuum imaging drum 300. Dye donor sheet material 36 now rests atop thermal print media 32 with a narrow space or gap between the two created by microbeads imbedded in the surface of thermal print media 32.

Figure 2:
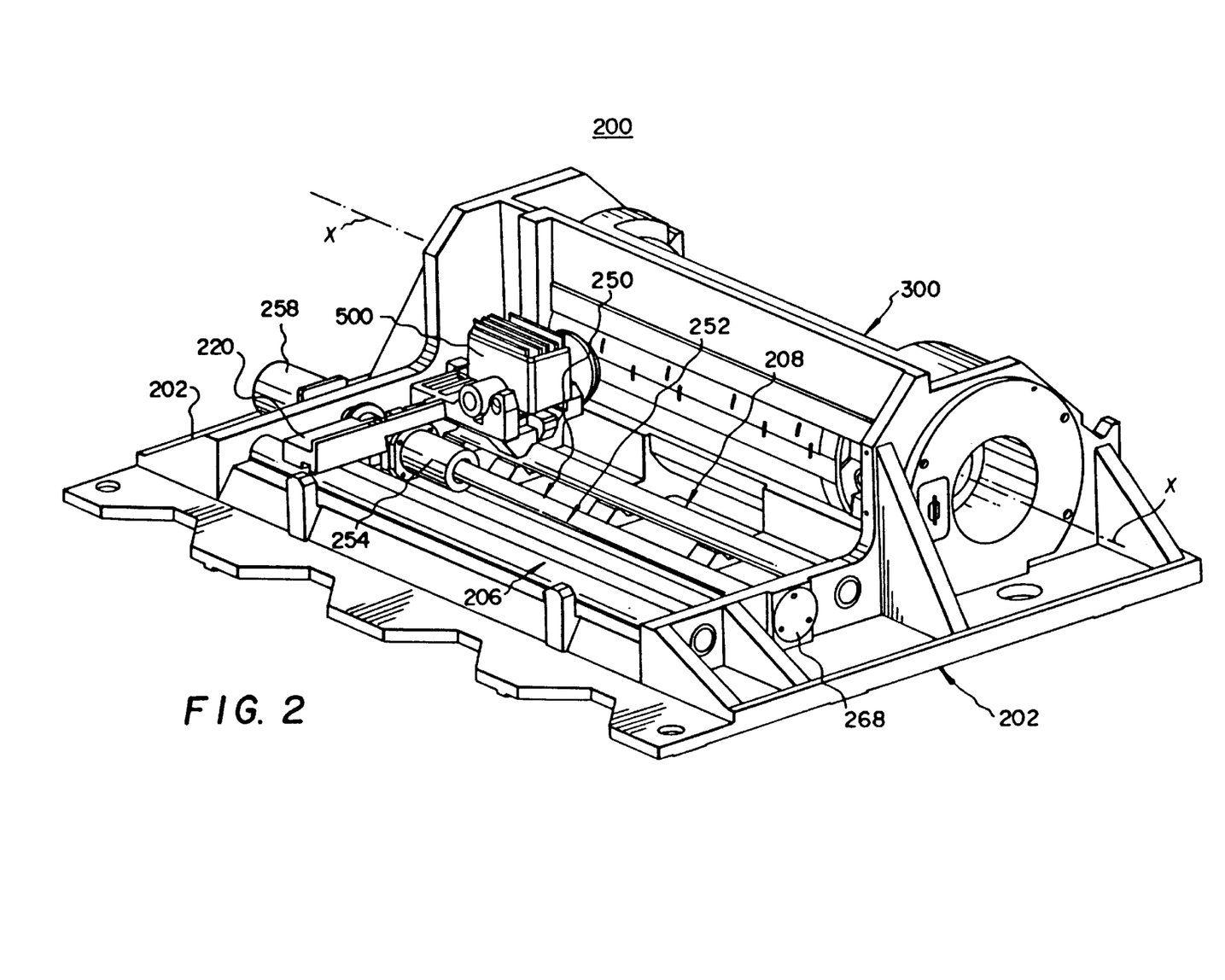
FIG. 2 is a perspective view of a lathe bed scanning subsystem or write engine of the present invention.

A laser assembly 400 includes a quantity of laser diodes 402 in its interior. Lasers diodes 402 are connected via fiber optic cables 404 to a distribution block 406 and ultimately to a printhead 500. Printhead 500 directs thermal energy received from laser diodes 402 causing dye donor sheet material 36 to pass the desired color across the gap to thermal print media 32. As shown in FIG. 2, printhead 500 is attached to a lead screw 250 via a lead screw drive nut 254 and a drive coupling (not shown) for permitting movement axially along the longitudinal axis of vacuum imaging drum 300. This permits a transferring of data to create an intended image on thermal print media 32. A linear drive motor 258 can be used to drive lead screw 250, while end cap 268 is mounted at the end of lead screw 250.

For writing, vacuum imaging drum 300 rotates at a constant velocity, and printhead 500 begins at one end of thermal print media 32 and traverse the entire length of thermal print media 32 for completing the transfer process for the particular dye donor sheet material 36 resting on thermal print media 32. After printhead 500 has completed the transfer process, for the particular dye donor sheet material 36 resting on thermal print media 32, dye donor sheet material 36 is then removed from vacuum imaging drum 300 and transferred out image processor housing 12 via a skive or ejection chute 16 (FIG. 1). As shown in FIG. 1, dye donor sheet material 36 eventually comes to rest in a waste bin 18 for removal by the user. The above described process is then repeated for the other three rolls 30 of dye donor roll materials 34.

After the color from all four rolls of dye donor materials 34 have been transferred and dye donor sheet materials 36 have been removed from vacuum imaging drum 300, thermal print media 32 is removed from vacuum imaging drum 300 and transported via a transport mechanism 80 to a dye binding assembly 180. An entrance door 182 of dye binding assembly 180 is opened for permitting thermal print media 32 to enter dye binding assembly 180, and shuts once the thermal print media 32 comes to rest in dye binding assembly 180. Dye binding assembly 180 processes thermal print media 32 for further binding the transferred colors on the thermal print media 32 and for sealing the microbeads thereon. After the color binding process has been completed, a media exit door 184 is opened and thermal print media 32 with the intended image thereon passes out of dye binding assembly 180 and image processor housing 12 and comes to rest against a media stop 20.

Referring again to FIG. 2, there is illustrated a perspective view of a lathe bed scanning subsystem 200 of image processing apparatus 10, including a vacuum imaging drum 300, printhead 500 and lead screw 250 assembled in lathe bed scanning frame 202. Vacuum imaging drum 300 is mounted for rotation about an axis 301 in lathe bed scanning frame 202. Printhead 500 is movable with respect to vacuum imaging drum 300, and is arranged to direct a beam of light to dye donor sheet material 36. The beam of light from printhead 500 for each laser diode 402 (not shown in FIG. 2) is modulated individually by modulated electronic signals from image processing apparatus 10, which are representative of the shape and color of the original image; so that the color on dye donor sheet material 36 is heated to cause volatilization only in those areas in which its presence is required on thermal print media 32 to reconstruct the shape and color of the original image.

Printhead 500 is mounted on a movable translation stage member 220 which, in turn, is supported for low friction slidable movement on translation bearing rods 206 and 208. Translation bearing rods 206 and 208 (rear and front) are sufficiently rigid so as not to sag or distort as is possible between their mounting points and are arranged as parallel as possible with an axis 301 of vacuum imaging drum 300. An axis of printhead 500 is perpendicular to axis 301 of vacuum imaging drum 300. Front translation bearing rod 208 locates translation stage member 220 in vertical and horizontal directions with respect to axis 301 of vacuum imaging drum 300. Rear translation bearing rod 206 locates translation stage member 220 only with respect to rotation of translation stage member 220 about front translation bearing rod 208, so that there is no over-constraint condition of translation stage member 220 which might cause it to bind, chatter, or otherwise impart undesirable vibration or jitters to printhead 500 during the generation of an intended image.

Figure 3:
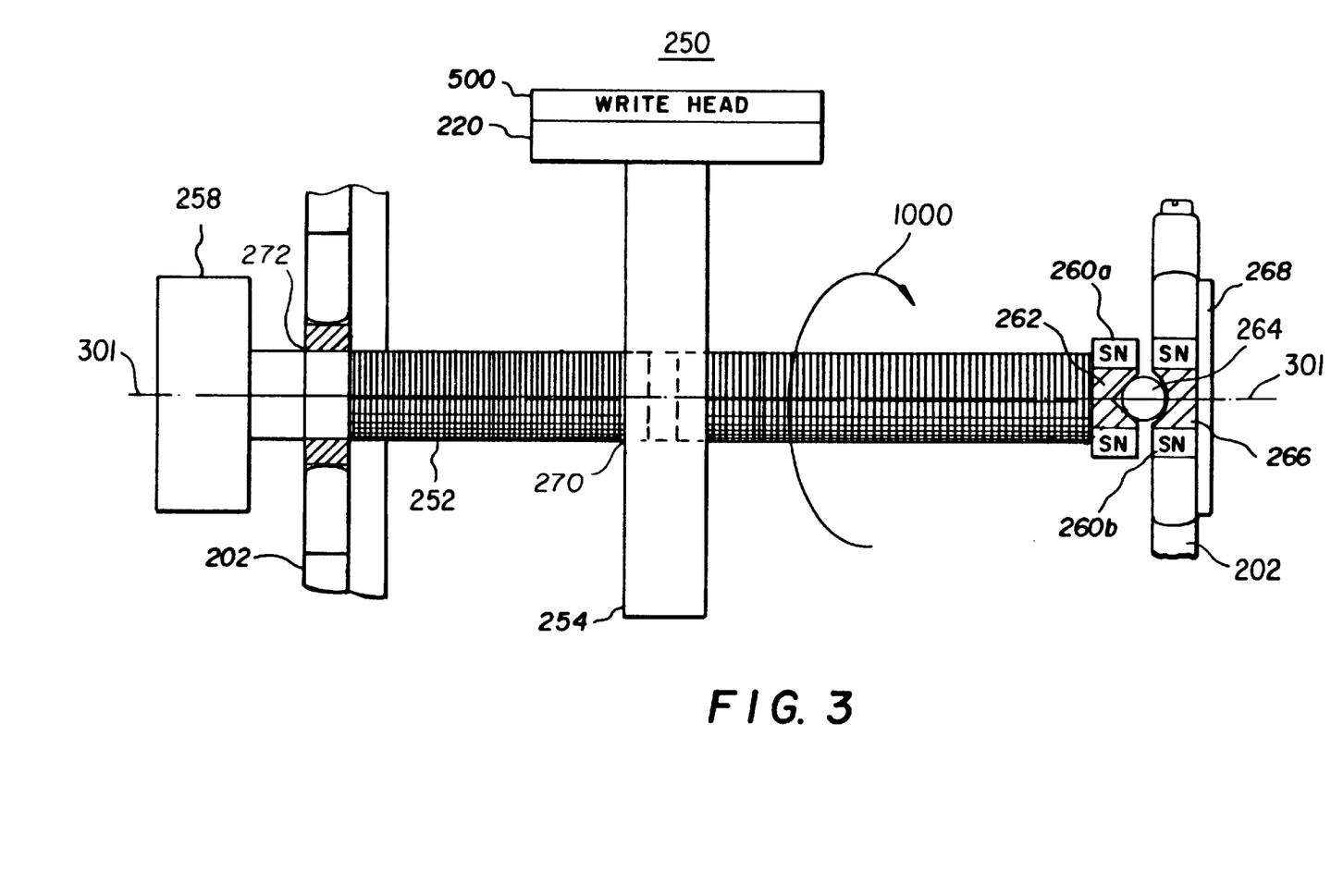
FIG. 3 shows a top view in horizontal cross section, partially in phantom, of the lead screw and translation subsystem of the present invention.

Referring to FIGS. 2 and 3, a lead screw 250 is shown which includes an elongated, threaded shaft 252 which is attached to linear drive motor 258 on its drive end and to lathe bed scanning frame 202 by means of a radial bearing 272. A lead screw drive nut 254 includes grooves in its hollowed-out center portion 270 for mating with the threads of threaded shaft 252 for permitting lead screw drive nut 254 to move axially along thread shaft 252 as threaded shaft 252 is rotated by linear drive motor 258. Lead screw drive nut 254 is integrally attached to printhead 500 through a lead screw coupling (not shown) and translation stage member 220 at its periphery so that as threaded shaft 252 is rotated by linear drive motor 258, lead screw drive nut 254 moves axially along threaded shaft 252 which in turn moves translation stage member 220 and ultimately printhead 500 axially along vacuum imaging drum 300.

As best illustrated in FIG. 3, an annular-shaped axial load magnet 260a is integrally attached to the driven end of threaded shaft 252, and is in a spaced apart relationship with another annular-shaped axial load magnet 260b attached to lathe bed scanning frame 202. Axial load magnets 260a and 260b are preferably made of rare-earth materials such as neodymium-iron-boron. A generally circular-shaped boss part 262 of threaded shaft 252 rests in a hollowed-out portion of annular-shaped axial load magnet 260a, and includes a generally V-shaped surface at the end for receiving a ball bearing 264. A circular-shaped insert 266 is placed in a hollowed-out portion of the other annular-shaped axial load magnet 260b, and includes an accurate-shaped surface on one end for receiving ball bearing 264, and a flat surface at its other end for receiving end cap 268. End cap 268 is placed over annular-shaped axial load magnet 260b and attached to lathe bed scanning frame 202, for protectively covering annular-shaped axial load magnet 260b and providing an axial stop for lead screw 250. Circular shaped insert 266 is preferably made of material such as Rulon J or Delrin AF, both well known in the art.

Lead screw 250 operates as follows. Linear drive motor 258 is energized and imparts rotation to the lead screw 250, as indicated by arrow 1000, causing lead screw drive nut 254 to move axially along threaded shaft 252. Annular-shaped axial load magnets 260a and 260b are magnetically attracted to each other which prevents axial movement of lead screw 250. Ball bearing 264, however, permits rotation of lead screw 250 while maintaining the positional relationship of annular-shaped axial load magnets 260a, 260b, i.e., slightly spaced apart, which prevents mechanical friction between them while obviously permitting threaded shaft 252 to rotate.

Printhead 500 travels in a path along vacuum imaging drum 300 and proportional to the width of a writing swath. The pattern that printhead 500 transfers to thermal print media 32 along vacuum imaging drum 300, is a helix.

Printhead 500 itself houses the optical components that write the swath within a cylindrical metal chassis. For this invention, this chassis can be fabricated from any suitable ferromagnetic material. Translation stage member 220 holds printhead 500 chassis in place by means of front and rear V-shaped housings.

Figure 4:
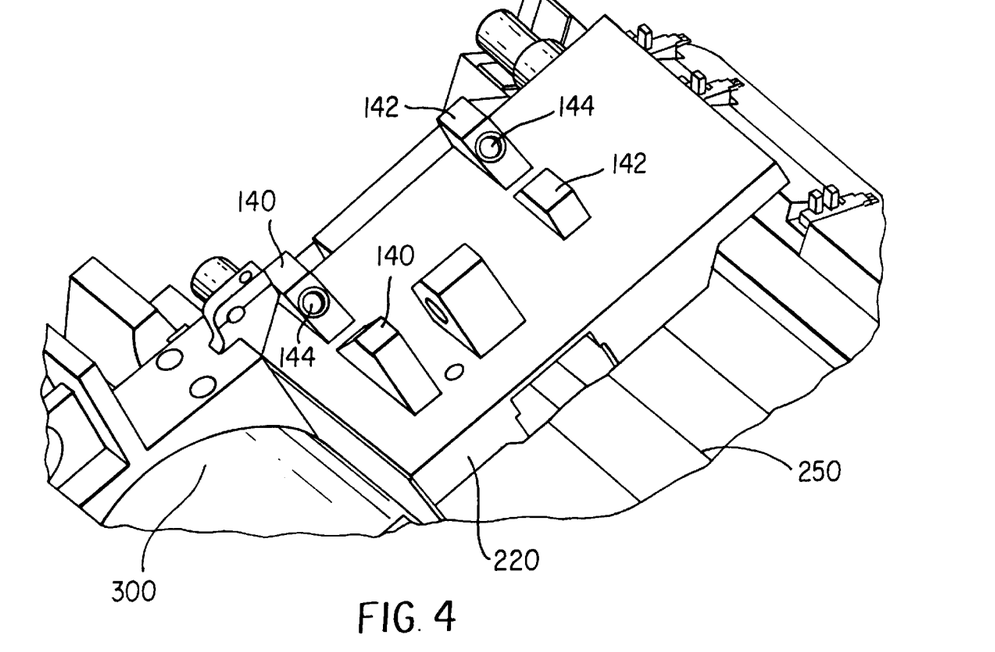
FIG. 4 is a perspective view from the top of the image processing apparatus, showing the translation stage that supports the print head (with the print head removed so that magnet and bearing cap positions are visible)

FIG. 4 shows how translation stage member 220 is positioned in one embodiment of this invention, relative to vacuum imaging drum 300. (FIG. 4 shows translation stage member 220 with printhead 500 and printhead support components removed.)

Figure 5:
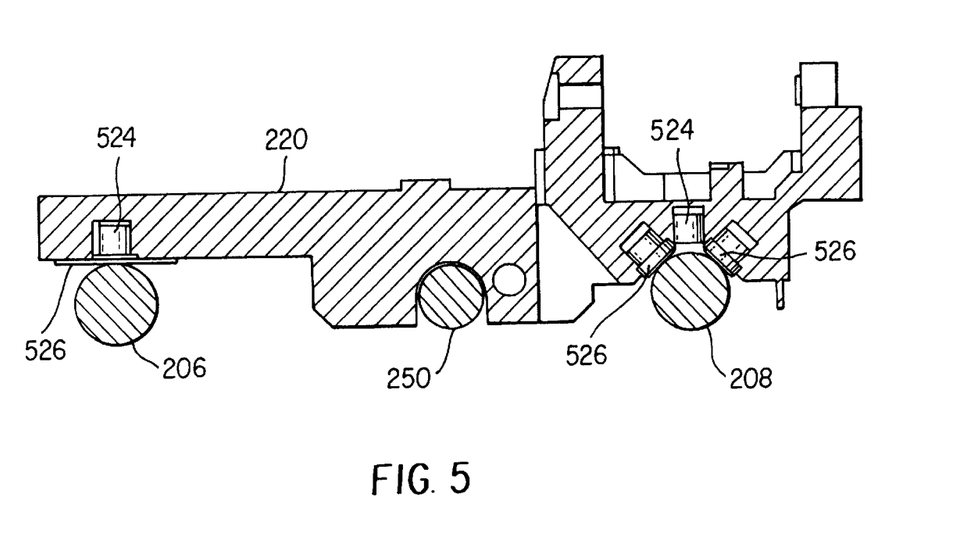
FIG. 5 is a cross-sectional view that shows the translation stage member in relation to front and rear translation bearing rods and a lead screw, and shows the position of magnets and bearings on the translation stage member.

The cross-sectional view of FIG. 5 shows how translation stage member 220 is disposed relative to front translation bearing rod 208, rear translation bearing rod 206, and lead screw 250. With this arrangement, translation stage member 220 is held against front translation bearing rod 208, substantially by its own weight (but assisted by translation stage magnets 524 at front and rear). Bearings 526 on translation stage member 220 provide low-friction contact against front translation bearing rod 208. Translation stage member 220 travels along bearing rods 206, 208 constrained in three planes; two of these planes are provided by bearings 526, the third plane is provided as translation stage member 220 rests on rear translation bearing rod 206. As FIG. 5 shows, bearings 526 allow an air gap between translation stage magnet 524 and front translation bearing rod 208. It is noted that for rear translation bearing rod 206 only one bearing 526 can be utilized as shown in FIG. 5.

Figure 6:
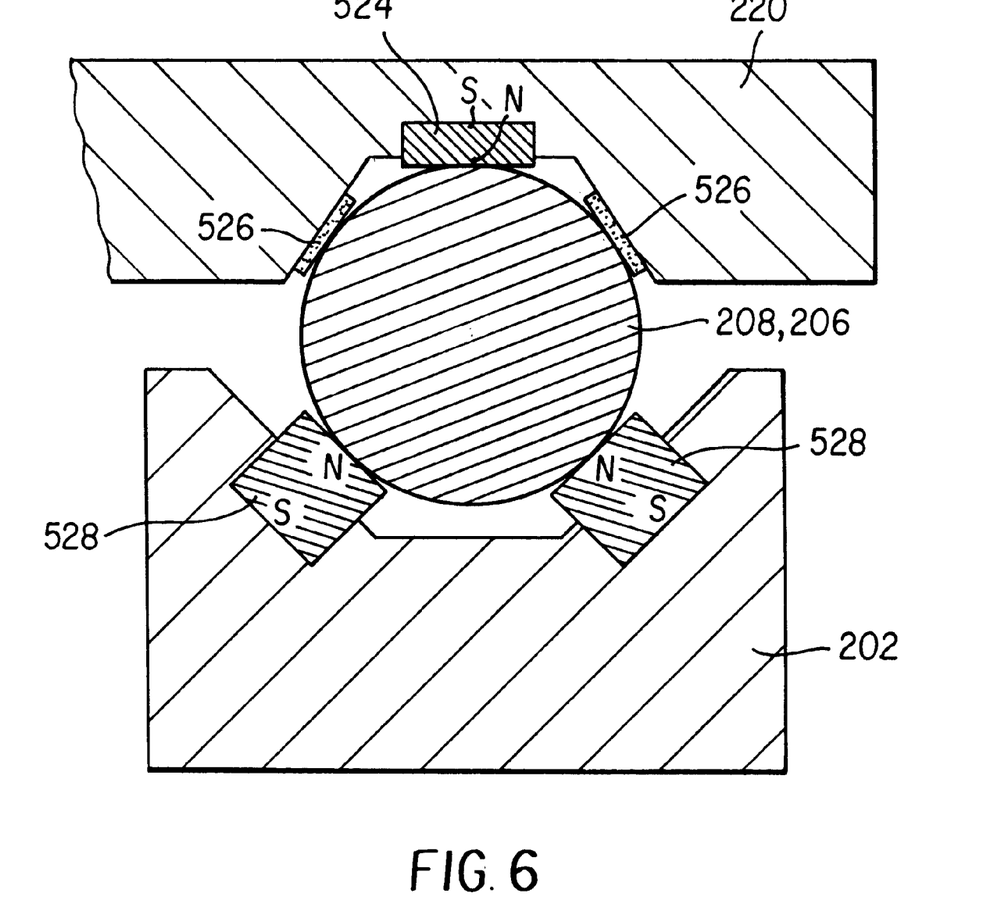
FIG. 6 is a cross-sectional view showing magnet positions and plurality at the front bearing translation rod in one embodiment of the invention.

The cross sectional view of FIG. 6 shows how magnetic members in the form of magnets are disposed on translation stage member 220 and beneath front translation bearing rod 208. Along the length of front translation bearing rod 208, a multiplicity of pairs of straightening magnets 528 are disposed in the approximate angular fashion shown. The (north/south) polarity of straightening magnets 528 is as indicated in FIG. 6. To provide repulsive force, translation stage magnet 524 is arranged with the polarity shown. This repulsive magnetic force facilitates the movement of translation stage member 220 along bearing rod 208. (The magnetic polarity shown also permits assembly of the straightening magnets 528 in the frame 202; if straightening magnets 528 were installed with complementary polarities facing front translation bearing rod 208, straightening magnets 528 would be attracted to each other and could be difficult to mount in the frame 202.)

Translation stage magnet 524 is selected for size and strength based on the relative strength of straightening magnets 528 and on the distance between these magnets. In the preferred embodiment of this invention, straightening magnets 528 have a typical holding strength of approximately 4.5 lbs. To provide repulsion, translation stage magnet 524 is typically specified at a 3–4 lbs. holding strength and is spaced approximately 0.020 in. from front translation bearing rod 208. Magnets can be of any suitable type; the preferred embodiment of this invention uses an alloy of bonded Neodymium-iron-boron (NdFeB).

Note that objectionable amounts of friction would be caused if magnet polarity were reversed from that shown in FIG. 6. In such a case, magnetic attraction between translation stage magnet 524 and straightening magnets 528 would cause localized areas of higher friction along the travel path (where the magnets come in proximity).

Figure 7:
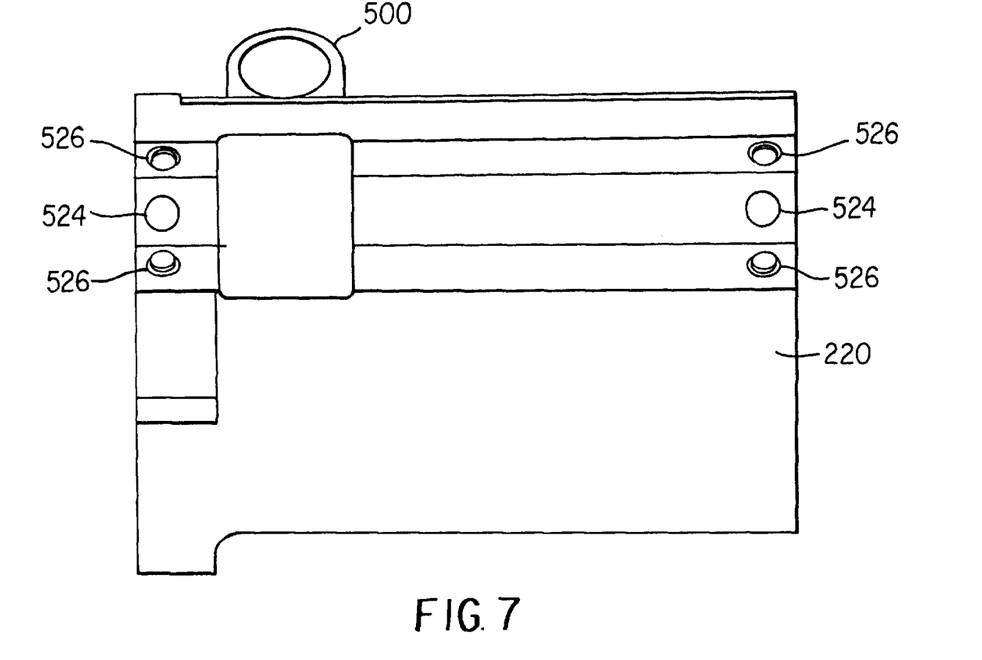
FIG. 7 is a dimensional view showing the underside of the front part of the translation stage member.

In a preferred embodiment of this invention, FIG. 7 shows the positions of translation stage magnets 524 and bearings 526 on the front portion of translation stage member 220.

Therefore, with the arrangement of the present invention, magnets 528 provide a magnetic attraction force to hold translation bearing rod 208 against frame 202. Also, as translation stage member 220 travels along translation bearing rod 208, when magnet 524 opposes magnets 528, the repulsive force due to the polarity orientation shown in FIG. 6 facilitates the movement of translation stage member 220 along translation bearing rod 208.

Referring back to FIG. 4, this figure further shows how front mounting blocks 140 and rear mounting blocks 142 form the previously described V-shaped housing for containment of printhead 500. In this feature of the present invention, magnetic members in the form of printhead holding magnets 144 clamp printhead 500 firmly into place within this V-shaped housing.

In a preferred embodiment of this invention, printhead holding magnets 144 are of type NdFeB (neodymium-iron boron), selected for high holding force (typically expressed in terms of energy product, $BH_{max}$). To protect the NdFeB alloy from rust and corrosion, the magnet can be coated with an electroless nickel-phosphorus alloy or other suitable coating. See for example, commonly assigned U.S. patent application Ser. No. 08/861,119.

Figure 8:
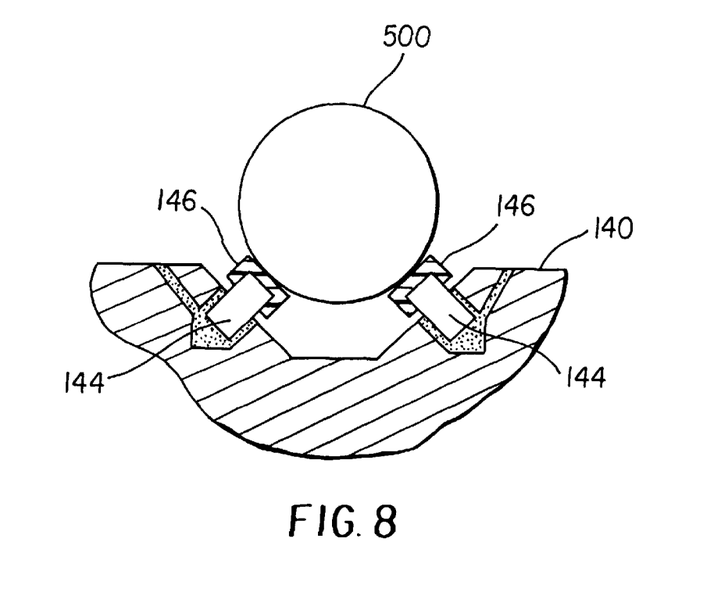
FIG. 8 is a cross-section of a further embodiment of the invention, as viewed from the front of the printhead, showing the relative positions of magnets that hold the printhead and showing the placement of bearing caps in position on these magnets.

The cross-section of FIG. 8 shows the orientation of printhead holding magnets 144 as held in front or rear mounting blocks 140 and 142, relative to the chassis of printhead 500. As shown in FIG. 8, holding magnets 144 are positioned at an appropriate angle to hold printhead 500.

The specific design problem that presents itself with respect to these printhead holding magnets 144 relates to the requirement that printhead 500 be adjustable within translation stage member 220. To summarize, correct focus requires that printhead 500 be movable forward or back, with respect to the central axis of the cylinder of printhead 500. Proper angular orientation (which determines the swath width) requires that printhead 500 be allowed to be rotated clockwise or counter-clockwise with respect to the central axis of the cylinder of printhead 500.

The dual requirement to hold printhead 500 firmly in place while, at the same time, allowing the above-mentioned adjustments to be performed places demands on the contact surfaces of printhead holding magnets 144. Frictional forces that result from moving the chassis of printhead 500 against the coated surface of printhead holding magnet 144 could easily cause the electroless nickel coating on the magnets to crack, chip, flake, wear, or otherwise lose its bond to the magnet itself. The electroless nickel-phosphorus coating provides a poor bearing surface that could not withstand repeated mechanical stress caused in making the above-mentioned adjustments.

To protect the surface of printhead holding magnets 144 and to provide an efficient bearing and/or contact surface that allows movement of the held item across the holding surface of the magnet, this invention uses bearing caps 146. Fabricated from suitable materials for the equipment environment, bearing caps 146 are mounted on top of printhead holding magnets 144, as shown in FIG. 8.

Bearing caps 146 can be fabricated from any suitable material that has the necessary characteristics for the application, well-known in the art. Suitable materials can include Delrin, Teflon™, Velspar, other plastics, ceramics, metals such as bronze or carbide, or other materials. The magnet surface could also be a ferro-magnetic material treated in a number of ways, including ceramic coating, laser-coating, or coating with a composite that include electroless nickel-phosphorus with co-deposit including Teflon (PTFE).

Mounting of bearing caps 146 to printhead holding magnets 144 can be accomplished in a number of ways. In the preferred embodiment of this invention, bearing caps 146 are epoxied or fixed by a suitable adhesive to printhead holding magnets 144. Other mounting methods could also be used, including holding bearing caps 146 magnetically. Alternately, bearing caps 146 could be pressed into place, soldered, or fixed atop magnets 144 by some other suitable method.

The combination of bearing cap 146 and printhead holding magnet 144 thus implemented effectively provides a low-cost bearing surface that provides its own load.

The contact surface of bearing cap 146 can be designed to have a spherical surface so that bearing cap 146 has a single point of contact against the chassis of printhead 500. Alternatively, bearing cap 146 can be designed to provide contact along a line across the surface of bearing cap 146 or designed to fit the curvature of the chassis of cylindrical printhead 500 to provide contact along the full surface of bearing cap 146.

The invention has been described with reference to the preferred embodiments thereof. However, it will be appreciated and understood that variations and modifications can be effected within the spirit and scope of the invention as described herein above and as defined in the appended claims, by a person of ordinary skill in the art, without departing from the scope of the invention. For example, the invention can be applicable to any device that uses a scanning head that is mounted on a translator stage. This could include imaging devices such as flat-bed scanners or any other devices that use a drum or platen for scanning or printing. Also, there are a number of alternative solutions for materials used to fabricate a bearing cap as well as for methods of attachment of the bearing caps to the magnet. This invention is also suited for other applications, including non-imaging applications, where magnets can be used to clamp and hold, while at the same time there is a requirement for moving the held item, in a sliding fashion, against the magnet surface. ps Parts List

10 Image processing apparatus
12 Image processor housing
14 Image processor door
16 Donor ejection chute
18 Donor waste bin
20 Media stop
30 Roll media
32 Thermal print media
34 Dye donor roll material
36 Dye donor sheet material
50*a* Lower sheet material tray
50*b* Upper sheet material tray
52*a* Lower media lift cam
52*b* Upper media lift cam
54*a* Lower media roller
54*b* Upper media roller
56 Media guide
58 Media guide rollers
60 Media staging tray
80 Transport mechanism
98 Master lathe bed scanning engine
100 Media carousel
110 Media drive mechanism
112 Media drive rollers
120 Media knife assembly
122 Media knife blades
140 Front mounting blocks
142 Rear mounting blocks
144 Printhead holding magnet
146 Bearing cap
180 Color binding assembly
182 Media entrance door
184 Media exit door
200 Lathe bed scanning subsystem
202 Lathe bed scanning frame
204 Entrance passageway
206 Rear translation bearing rod
208 Front translation bearing rod
220 Translation stage member
250 Lead screw
252 Threaded shaft
254 Lead screw drive nut
258 Linear drive motor
260*a* Axial load magnet
260*b* Axial load magnet
262 Circular-shaped insert
264 Ball bearing
266 Circular-shaped insert
268 End cap
300 Vacuum imaging drum
301 Axis of rotation
400 Laser assembly
402 Lasers diode
404 Fiber optic cables
406 Distribution block
500 Printhead
524 Translation stage magnet
526 Bearings
528 Straightening magnets

What is claimed is:

1. An imaging apparatus for writing images to thermal print media, the apparatus comprising:

an imaging drum for holding a receiver that accepts an image;

a printhead having at least one light source, said printhead being movable relative to said imaging drum along a travel path;

a frame having at least one first magnet located thereon which provides a magnetic force;

at least one translation rod that guides the printhead along said travel path, said at least one translation rod being magnetically held against said frame of said image processing apparatus by said at least one first magnet; and a movable translation stage member on which said printhead is mounted, at least one second magnet being provided on said movable translation stage member so as to create a repulsive force against said magnetic force of said at least one first magnet.

2. An apparatus according to claim 1, further comprising:

a plurality of bearings arranged along the translation stage member so as to guide said translation stage member along said at least one translation rod.

3. An imaging apparatus comprising:

a translation stage member which holds a printhead thereon, said translation stage member being movable along a travel path;

at least one translation rod which guides said translation stage member along said travel path;

a frame;

a first magnetic member associated with said frame, said first magnetic member providing a magnetic force that holds said at least one translation rod against said frame; and a second magnetic member associated with said translation stage member and positioned so as to create a repulsive force against said magnetic force of said first magnetic member when said second magnetic member opposes said first magnetic member.

4. An apparatus according to claim 3, further comprising a third magnetic member associated with said frame, each of said first and third magnetic members are positioned on said frame at an angle to hold said translation rod against said frame.

5. An apparatus according to claim 3, further comprising a plurality of bearings disposed along said translation stage member.

6. A method of movably supporting a printhead of an imaging apparatus, the method comprising the steps of:

mounting a printhead on a translation stage member, said translation stage member having a first magnet positioned thereon;

holding a translation rod against a frame of said imaging apparatus by a magnetic force of at least one second magnet positioned on said frame, said translation rod guiding said translation stage member; and mounting said translation stage member on said translation rod so that said first magnet provides a repulsive force against the magnetic force of said at least one second magnet when said first magnet opposes said at least one second magnet.

7. A method according to claim 6, comprising the further step of:

providing bearings along said translation stage member.

8. An image processing apparatus for writing images to a thermal print media, the apparatus comprising:

a printhead having a plurality of light sources;

a vacuum imaging drum; and a translation stage member that holds said printhead in position adjacent to said imaging drum;

said translation stage member comprising at least one mounting block that provides a holder for said printhead, and at least one magnet positioned on said at least one mounting block, said at least one magnet being positioned at an angle for holding said printhead so that said printhead is aligned in position adjacent to said imaging drum and permitting linear and rotational movement of said printhead relative to said translation stage member.

9. An image processing apparatus according to claim 8, further comprising a bearing cap provided on said at least one magnet to provide a contact surface with said printhead, said at least one bearing cap protecting said at least one magnet as said printhead is adjusted forward or backward or turned angularly relative to its central cylindrical axis.

10. An image processing apparatus according to claim 9, wherein said at least one bearing cap is fabricated from metal or metal alloy.

11. An image processing apparatus according to claim 9, wherein said at least one bearing cap is fabricated from plastic or ceramic material.

12. An image processing apparatus according to claim 9, wherein said at least one bearing cap is held on said at least one magnet by magnetic attraction.

13. An image processing apparatus according to claim 9, wherein said at least one bearing cap is affixed to said at least one magnet by adhesive.

14. An image processing apparatus according to claim 9, wherein said at least one bearing cap is pressed onto said at least one magnet.

15. A method of movably supporting a printhead of an imaging apparatus, the method comprising the steps of:

providing at least one mounting block on a translation stage member of an imaging apparatus;

providing first and second magnetic members on said at least one mounting block; and providing a printhead on said at least one mounting block such that said first and second magnetic members support said printhead and permit linear and rotational movement of said printhead.

16. A method according to claim 15, comprising the further step of positioning said first and second magnetic members on said at least one mounting block so as to be at an angle to hold said printhead.

17. A method according to claim 15, comprising the further step of:

providing bearing caps on each of said first and second magnetic members so as to provide a protective contact surface between said first and second magnetic members and said printhead.

* * * * *